(12) United States Patent
Kim et al.

(10) Patent No.: US 8,954,576 B2
(45) Date of Patent: Feb. 10, 2015

(54) TEST ANALYSIS SYSTEM OF NETWORK AND ANALYSIS METHOD THEREOF

(75) Inventors: Hang Kee Kim, Daejeon-si (KR); Chang Joon Park, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 259 days.

(21) Appl. No.: 13/527,388

(22) Filed: Jun. 19, 2012

(65) Prior Publication Data

US 2013/0073718 A1    Mar. 21, 2013

(30) Foreign Application Priority Data

Sep. 16, 2011  (KR) .......................... 10-2011-0093536

(51) Int. Cl.
  *G06F 15/173* (2006.01)
  *H04L 12/26* (2006.01)
  *H04L 12/24* (2006.01)

(52) U.S. Cl.
  CPC ................ *H04L 43/04* (2013.01); *H04L 43/50* (2013.01); *H04L 41/064* (2013.01)
  USPC ........... 709/224; 709/223; 709/238; 709/250; 370/252; 455/564

(58) Field of Classification Search
  USPC .................. 709/224, 223, 238, 250; 455/564; 370/252
  See application file for complete search history.

(56) References Cited

U.S. PATENT DOCUMENTS

| | | | | |
|---|---|---|---|---|
| 6,725,048 | B2 * | 4/2004 | Mao et al. | 455/456.2 |
| 6,799,209 | B1 * | 9/2004 | Hayton | 709/223 |
| 6,816,720 | B2 * | 11/2004 | Hussain et al. | 455/404.2 |
| 7,181,529 | B2 * | 2/2007 | Bhatia et al. | 709/238 |
| 2002/0037709 | A1 * | 3/2002 | Bhatia et al. | 455/414 |
| 2002/0037722 | A1 * | 3/2002 | Hussain et al. | 455/435 |
| 2002/0037731 | A1 * | 3/2002 | Mao et al. | 455/453 |
| 2002/0037744 | A1 * | 3/2002 | Bhatia et al. | 455/557 |
| 2002/0037750 | A1 * | 3/2002 | Hussain et al. | 455/564 |
| 2002/0038362 | A1 * | 3/2002 | Bhatia et al. | 709/224 |
| 2002/0038386 | A1 * | 3/2002 | Bhatia et al. | 709/250 |
| 2002/0095312 | A1 * | 7/2002 | Wheat | 705/1 |
| 2009/0135731 | A1 * | 5/2009 | Secades et al. | 370/252 |

FOREIGN PATENT DOCUMENTS

KR  100965157 B1  6/2010
KR  1020100116408 A  11/2010

* cited by examiner

*Primary Examiner* — Tammy Nguyen

(57) ABSTRACT

The test analysis system of a network according to an exemplary embodiment of the present invention includes: a server group having at least one server performing at least any one of generation of real-time information and storage of a server local log according to test scenarios; a client group having at least one client. communicating with the server group and performing at least any one of the generation of the real-time information and the storage of the local log according to the test scenarios; and a monitoring system storing the real-time information as a system log while monitoring the real-time information received from the server group and the client group during the execution of the test scenarios and informing a test manager of the monitored real-time information.

17 Claims, 6 Drawing Sheets

TEST ANALYSIS SYSTEM OF NETWORK AND ANALYSIS METHOD THEREOF

CROSS-REFERENCE TO RELATED APPLICATIONS

This application claims the benefit of priority of Korean Patent Application No. 10-2011-0093536 filed on Sep. 16, 2011, all of which are incorporated by reference in their entirety herein.

BACKGROUND OF THE INVENTION

1. Field of the invention

The present invention relates to a test analysis system of a network and an analysis method thereof, and more particularly, to a test analysis system of a network and an analysis method thereof capable of monitoring a test of severs and clients on a network in real time.

2. Related Art

Testing stability of a system on a network system that performs network communications is one of the important factors in a network service. In particular, online games in which many people plays games on the network system, the stability of the system is one of more important factors.

According to the existing test method for confirming the stability of the network system, when problems occur during performance of communications (for example, performing scenarios on online games) between servers and clients, a tester reports the problems to a test manager. Further, the test manager uses a scheme of receiving the problems from the tester and then, using analyzes logs of the individual clients and servers and searching the problems.

Further, the test for confirming the stability on the network system according to the related art is disclosed in 'real-time server management solution" of Korean Patent No. 0965157. Herein, the 'real-time server management solution" of Korean Patent No. 0965157 includes a function of monitoring a state of remote servers by selection of a server manager.

However, the test scheme for confirming the stability on the network system according to the related art is performed by a passive scheme of receiving a report from the tester and then, allowing the test manager to analyze the logs of the individual clients and servers or monitoring the state of the remote servers by the selection of the server manger, which leads to an increase in time consumed to analyze the problems during the performance of the test. Further, the test scheme of the network system according to the related art allows the tester manager to derive test analysis results by the passive scheme after the test ends, which leads to the increase in required time.

RELATED ART DOCUMENT

Patent Document

Korean Patent No. 0965157

SUMMARY OF THE INVENTION

The present invention provides a test analysis system of a network and an analysis method thereof capable of automatically monitoring problems during automatic execution of test scenarios according to the test scenarios.

The present invention also provides a test analysis system of a network and an analysis method thereof capable of informing analyzed results by integrating status information of servers and clients during automatic execution of test scenarios when the test scenarios are completed.

In an aspect, there is provided a test analysis system of a network including: a server group having at least one server performing at least any one of generation of real-time information and storage of a server local log according to test scenarios; a client group having at least one client communicating with the server group and performing at least any one of the generation of the real-time information and the storage of the local log according to the test scenarios; and a monitoring system storing the real-time information as a system log while monitoring the real-time information received from the server group and the client group during the execution of the test scenarios and informing a test manager of the monitored real-time information, wherein the monitoring system integrally analyzes the server local log, the local log, and the system log received from the server group and the client group and informs the test manager of the integrally analyzed logs after the test scenarios are completed.

The monitoring system may include: a communication unit communicating with the server group and the client group so as to receive the real-time information, the server local log, and the local log; a monitoring storage unit storing the real-time information received from the communication unit as the system log; an integration analysis unit integrally analyzing the server local log received from the communication unit and the local log and the system log stored in the monitoring storage unit; a display unit displaying the real-time information received in the communication unit and analysis data analyzed from the integration analysis unit; and a control unit controlling the display unit so as to display the real-time information received in the communication unit and controlling the display unit so as to display the analysis data based on signals analyzed by the integration analysis unit.

The real-time information may generate a smaller amount of data than that of the server local log and the local log.

The real-time information may include a CPU, a memory, an HDD, a network load amount, Ping, and round-trip time (RTT).

The server local log and the local log may include system information and application information of the server group and the client group during the execution of the test scenarios.

The server local log and the local log may be integrated with the system log so as to be used only at the time of the test result analysis.

The monitoring system may receive start, completion, exceptional situation information of the test scenarios from the server group and the client group.

The integration of the server local log and the local log with the system log may be performed after synchronization of each storage time.

In another aspect, there is provide a test analysis method of a network including a server group having at least one server, a client group having at least one client, and a monitoring system, the test analysis method including: (a) calculating time synchronization information of the server group, the client group, and the monitoring system; (b) storing a server local log and a local log in the server group and the client group, respectively, while transmitting real-time information of the server group and the client group to the monitoring system at the time of executing test scenarios; (c) storing the real-time information in the monitoring system as a system log while informing a test manager of the real-time information of the server group and the client group transmitted to the monitoring system; (d) generating an integrated log by integrating the server local log, the local log, and the system log after the execution of the test scenarios of the server group and the client group is completed; and (e) informing the test manager of analyzed results by analyzing the integrated log.

The real-time information may generate a smaller amount of data than that of the server local log and the local log.

At step (b), start, completion, and exceptional situations of the test scenarios may be transmitted to the monitoring system at the time of the execution of the test scenarios.

At step (d), the integration of the server local log and the local log with the system log may be performed after performing synchronization using time synchronization information.

The real-time information may include a CPU, a memory, an HDD, a network load amount, Ping, and round-trip time (RTT).

The server local log and the local log may include system information and application information of the server group and the client group during the execution of the test scenarios.

Detailed matters of other exemplary embodiments of the present invention are included in a detailed description and drawings.

DESCRIPTION OF EXEMPLARY EMBODIMENTS

Hereinafter, a test analysis system of a network and an analysis method thereof according to an exemplary embodiment of the present invention will be described in detail with reference to the accompanying drawings.

Prior to describing this, it is to be noted that the test analysis system of a network and the analysis method thereof according to the exemplary embodiment of the present invention are implemented on a network system used for online games.

However, the test analysis system of a network and the analysis method according to the exemplary embodiment of the present invention may also be implemented on various network systems such as online shopping in addition to online games.

Figure 1:
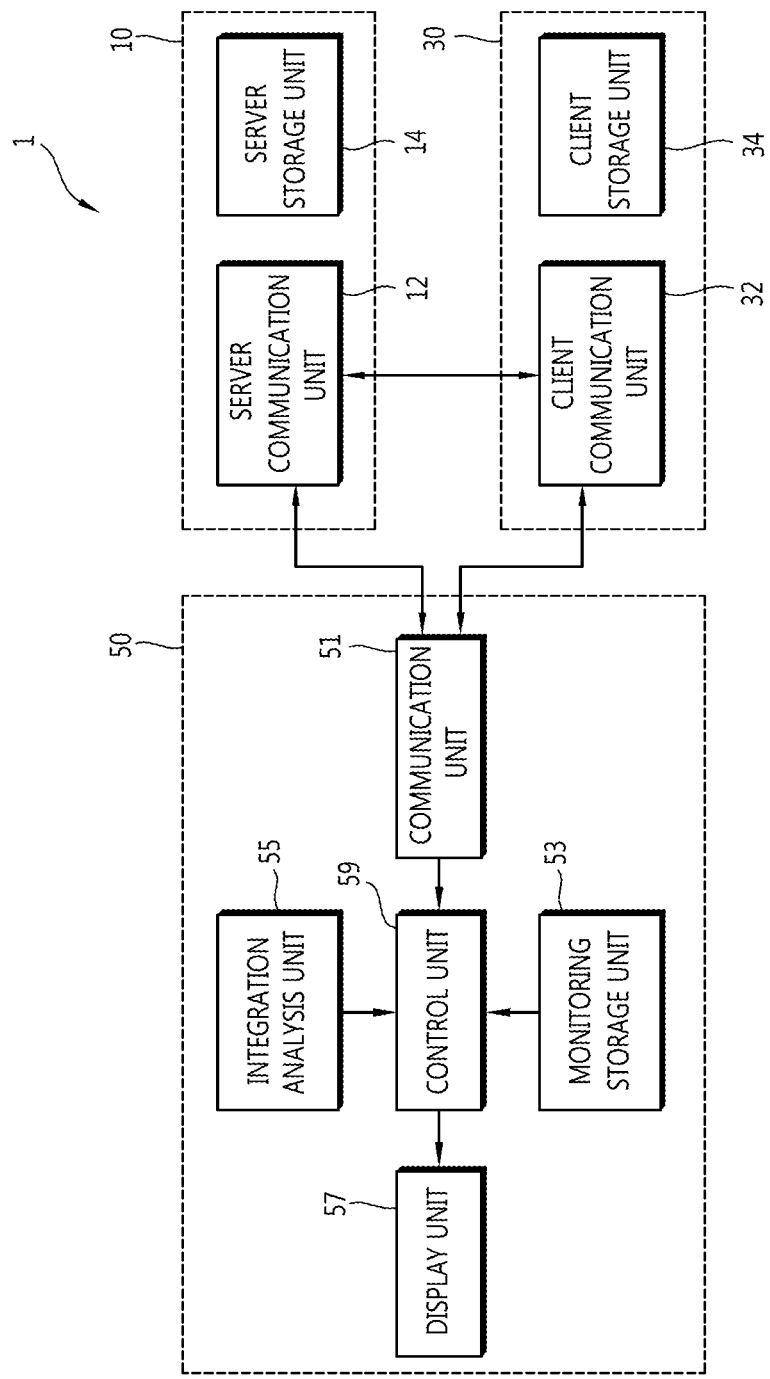
FIG. 1 is a control block diagram of a test analysis system of a network according to an exemplary embodiment of the present invention.
Figure 2:
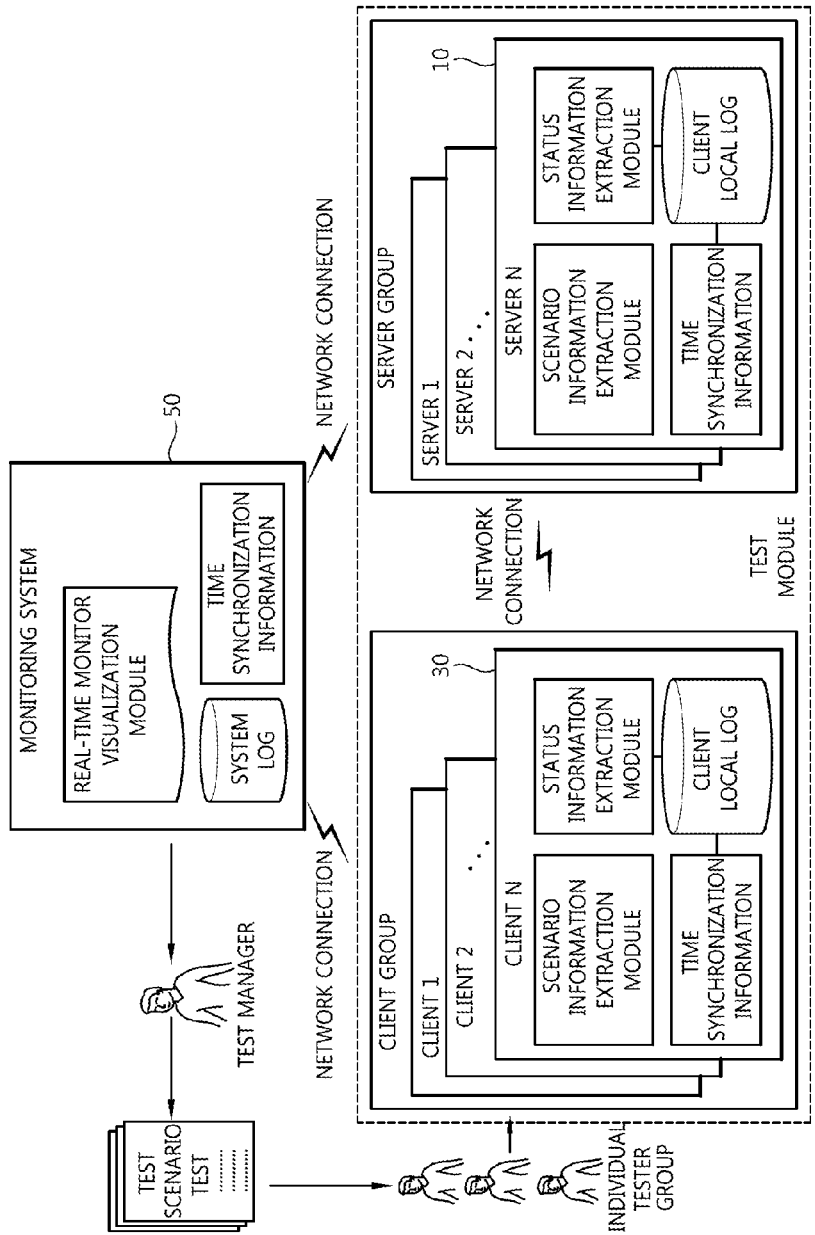
FIG. 2 is a schematic configuration diagram for executing a test of the test analysis system of a network according to the exemplary embodiment of the present invention.

FIG. 1 is a control block diagram of a test analysis system of a network according to an exemplary embodiment of the present invention and FIG. 2 is a schematic configuration diagram for executing a test of the test analysis system of a network according to the exemplary embodiment of the present invention.

As shown in FIGS. 1 and 2, a test analysis system 1 of a network according to the exemplary embodiment of the present invention includes a server group, a client group, and a monitoring system 50. The test analysis system 1 of a network according to the exemplary embodiment of the present invention monitors and analyzes problems of a server group and a client group by performing test scenarios for online games.

Here, the test scenarios may have a hierarchical structure. That is, any test scenario may include a lower scenario set. In this case, when all the scenarios are executed and even when each lower scenario starts, information is transmitted to the monitoring system 50.

The server group includes at least one server 10. That is, the server group includes the number of any servers 10 from 1 to N. The server 10 includes a server communication unit 12 and a server storage unit 14. In addition, the server 10 includes a scenario information extraction module and a status information extraction module. The status information of the server 10 includes real-time information and a server local log during the execution of the test scenarios.

The server communication unit 12 communicates with a communication unit 51 of the monitoring system 50 to be described below so as to transmit the real-time information extracted from the status information extraction module and a server local log extracted and stored from the status information extraction module. That is, the real-time information transmitted to the communication unit 51 from the server communication unit 12 is displayed on a display unit 57 according to a control of a control unit 59. Further, the server local log transmitted to the communication unit 51 from the server communication unit 12 is displayed on a display unit 57 as test analysis results according to the control of the control unit 59.

The server storage unit 14 stores the server local log extracted from the status information extraction module. The server local log stored in the server storage unit 14 is used as the test analysis results after the test scenario are completed.

Next, the client group mutually communicates with the server group and includes at least one client 30. The client 30 according to the exemplary embodiment of the present invention includes a client communication unit 32 and a client storage unit 34. The client group has the number of any clients 30 from 1 to N such as the server group. Here, the client 30 may correspond to the number of servers 10 and one server 10 may be networked with a plurality of clients 30. Further, the client 30 includes a scenario extraction module and a status information extraction module similar to the server. The status information of the client 30 includes real-time information and a server local log during the execution of the test scenarios.

The client communication unit 32 communicates with the communication unit 51 of the monitoring system 50 so as to transmit the real-time information extracted from the status information extraction module and a local log extracted and stored from the status information extraction module. That is, the real-time information transmitted to the communication unit 51 of the monitoring system 50 from the client communication unit 32 is displayed on the display unit 57 according to the control of the control unit 59. Further, the local log transmitted to the communication unit 51 of the monitoring system 50 from the client communication unit 32 is displayed on the display unit 57 as the test analysis results according to the control of the control unit 59. Further, the client communication unit 32 communicates with the server communication unit 12 for executing the test scenarios.

The client storage unit 34 stores the local log extracted from the status information extraction module. The local log stored in the client storage unit 34 is used as the test analysis results along with the server local log stored in the server storage unit 14 after the test scenarios are completed.

Meanwhile, as described above, the reason why the server 10 and the client 30 differentiate the real-time information and the server local log and the local log and transmit them to the monitoring system 50 is as follows.

The real-time information of the server 10 and the client 30 from the execution of the test scenarios to the completion thereof, for example, a CPU, a memory, an HDD, a network load amount, Ping, and round-trip time (RTT) are transmitted to the monitoring system 50 in real time.

On the other hand, the server local log and the local log stored in the server 10 and the client 30, for example, the system information and application information are not transmitted to the monitoring system 50 in real time and after the execution of the test scenarios is completed, are transmitted to the monitoring system 50.

The reason of differentiating the real-time information and the server local log and the local log and transmitting them to the monitoring system 50 is that the data generation amount of the real-time information is smaller than that of the server local log and the local log to minimize loads on the network. That is, the server local log and the local log generates a large amount of data as the status information change for each user, packets transmitted and received to and from the client 30, an input log of the client 30, or the like, which may lead to overload on the network in transmitting the test scenarios in real time at the time of executing the test scenarios. Therefore, the server local log and the local log are transmitted to the monitoring system 50 for analyzing the results after the execution of the test scenarios is completed.

Figure 3:
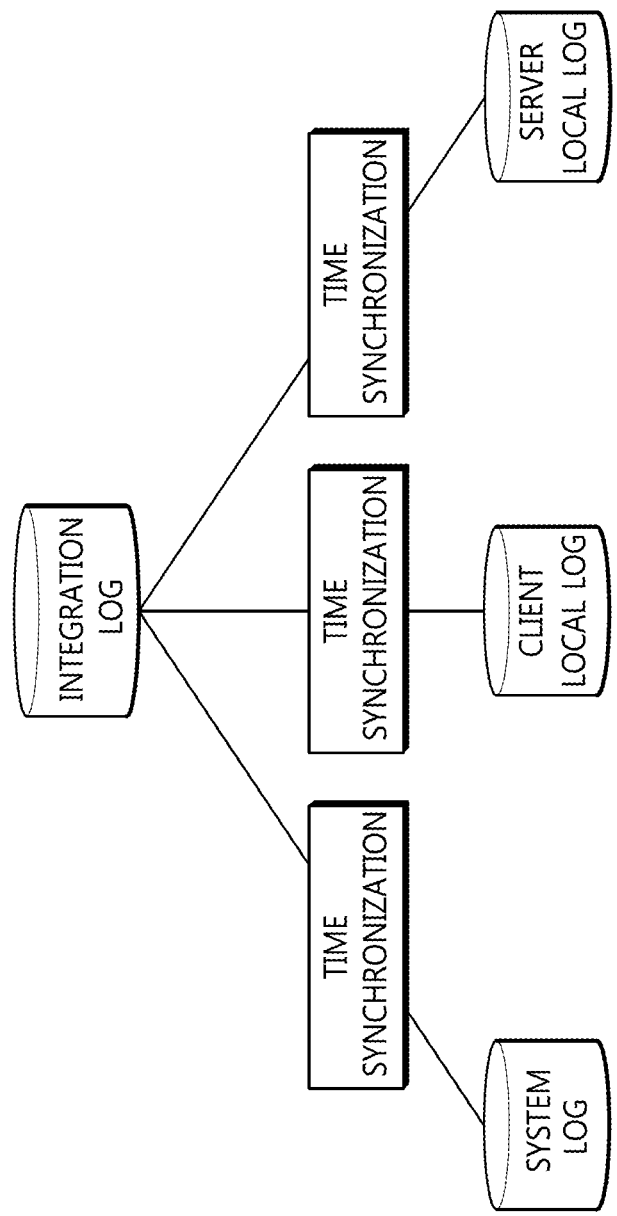
FIG. 3 is a configuration diagram for generating integration logs by integrating a server local log stored in the server group and the client group shown in FIG. 1 and a system log stored in a monitoring system.
Figure 4:
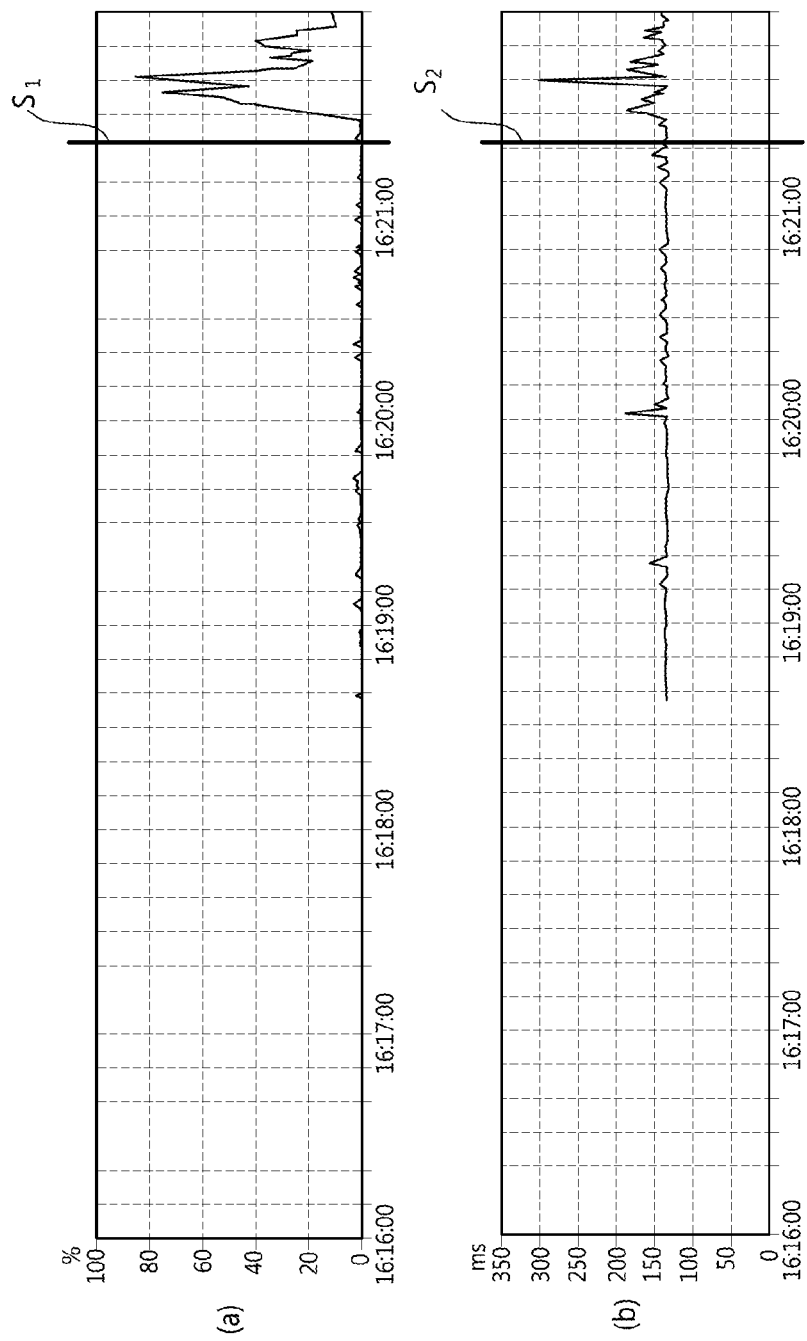
FIG. 4 is a graph showing an example of informing monitored real-time information and analyzed results in the monitoring system shown in FIG. 1.

Finally, FIG. 3 is a configuration diagram for integrating server local logs stored in the server group and the client group shown in FIG. 1 to generate the integrated log and a system log stored in a monitoring system and FIG. 4 is a graph showing an example of informing monitored real-time information and analyzed results in the monitoring system shown in FIG. 1.

As shown in FIGS. 3 and 4, the monitoring system 50 includes the communication 51, a monitoring storage unit 53, an integration analysis unit 55, the display unit 57, and the control unit 59. The monitoring system 50 monitors the real-time information received from the server group and the client group and stores the real-time information as the system log while informing the test manager of the real-time information. In addition, the monitoring system 50 integrally analyzes the server local log, the local log, and the system log received from the server group and the client group and informs the test manager of the integrally analyzed logs.

The communication unit 51 communicates with the server communication unit 12 and the client communication unit 32 to receive the real-time information. In addition, the communication unit 51 communicates with the server communication unit 12 and the client communication unit 32 to receive the server local log and the local log.

When the tester selects the test scenarios to be performed, the communication unit 51 receives the fact that the corresponding test scenarios starts from the client 30 and receives a start time at the time of receiving the corresponding test scenarios. Further, when the corresponding test scenarios are completed, the communication unit 51 receives the corresponding scenario completion information from the client 30. Further, the communication unit 51 receives exceptional situations of the corresponding test scenarios, for example, execution disable information of the scenarios due to errors, mission failure, or the like, during the execution of the scenarios, from the client 30.

The monitoring storage unit 53 stores the real-time information received from the communication unit 51 as the system log. The system log stored in the monitoring storage unit 53 is used to analyze the results in the integration analysis unit 55 after the execution of the test scenarios is completed.

The integration analysis unit 55 integrally analyzes the system log stored in the monitoring storage unit 53 with the server local log and the local log received from the communication unit 51. That is, as shown in FIG. 3, the server local log of the server 10, the local log of the client 30, and the system log of the monitoring storage unit 53 are integrally analyzed as the integrated log by the integration analysis unit 55.

The integration analysis unit 55 synchronizes and integrally analyzes the time of the server local log of the server 10 and time of the local log and the system log of the client, based on S1 and S2 as shown in FIGS. 4A and 4B. For reference, FIG. 4A is a graph showing a time-scenario completion rate and FIG. 4B is a graph showing time-transmission rate (a networking state between the server and the client).

The display unit 57 displays the real-time information of the server 10 and the client 30 received in the communication unit 51 and analysis data analyzed from the integration analysis unit 55. For example, the display unit 57 displays the start, completion, exceptional situations, and real-time information of the test scenarios so as to be informed to the test manager in real time. Further, the display unit 57 displays the analyzed results so as to inform the test manager of the test results analyzed by the integration analysis unit 55 after the execution of the test scenarios is completed.

The control unit 59 controls the display unit 57 so as to inform the test manager of the start, completion, exceptional situations, and real-time information of the test scenarios received in the communication unit 51. In addition, the control unit 59 controls the display unit 57 so as to display the analysis data based on the signals analyzed by the integration analysis unit 55. As such, the control unit 59 controls the display unit 57 so as to automatically inform the test manager of the real-time information at the time of executing the test scenarios and the analyzed results after the execution of the test scenarios is completed based on the signals from the communication unit 51 and the integration analysis unit 55, thereby making it possible to rapidly recognize the test situations and results at the time of the test of the network.

Figure 5:
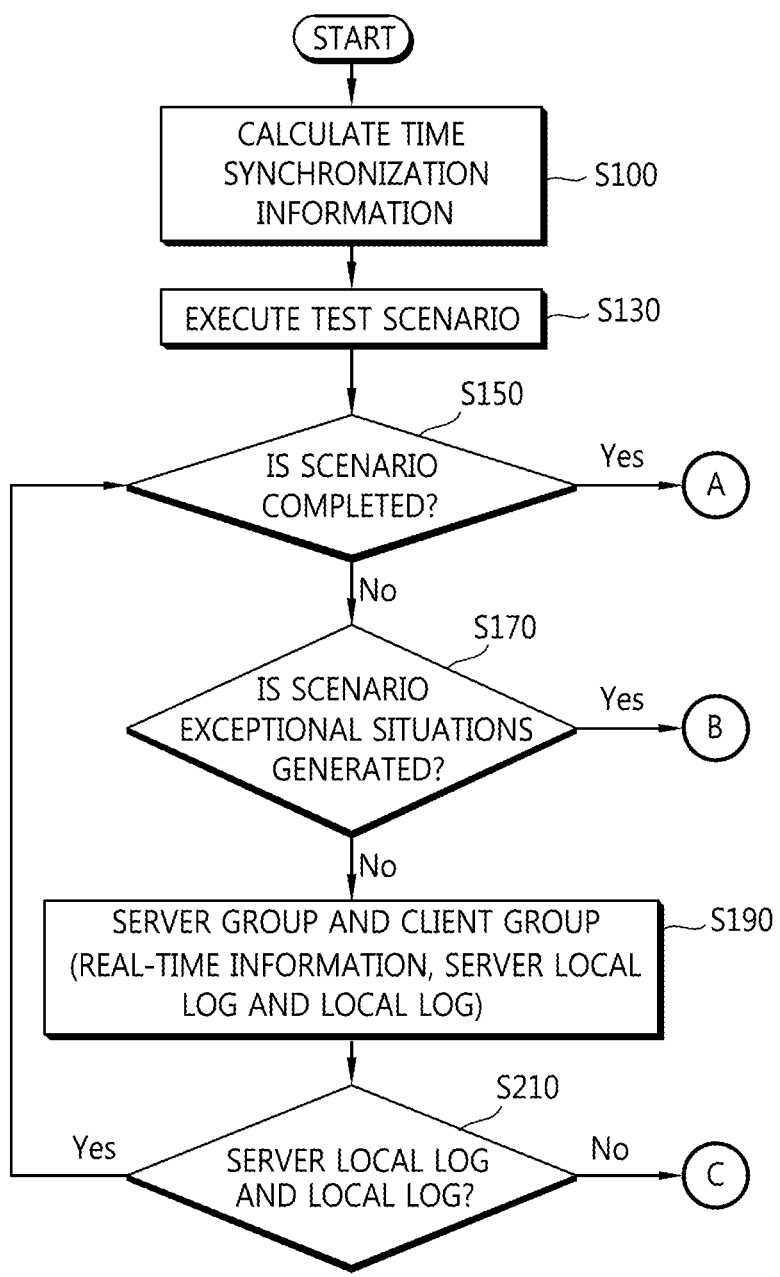
FIGS. 5 and 6 are flow charts of a method for analyzing a test analysis system of a network according to another exemplary embodiment of the present invention.
Figure 6:
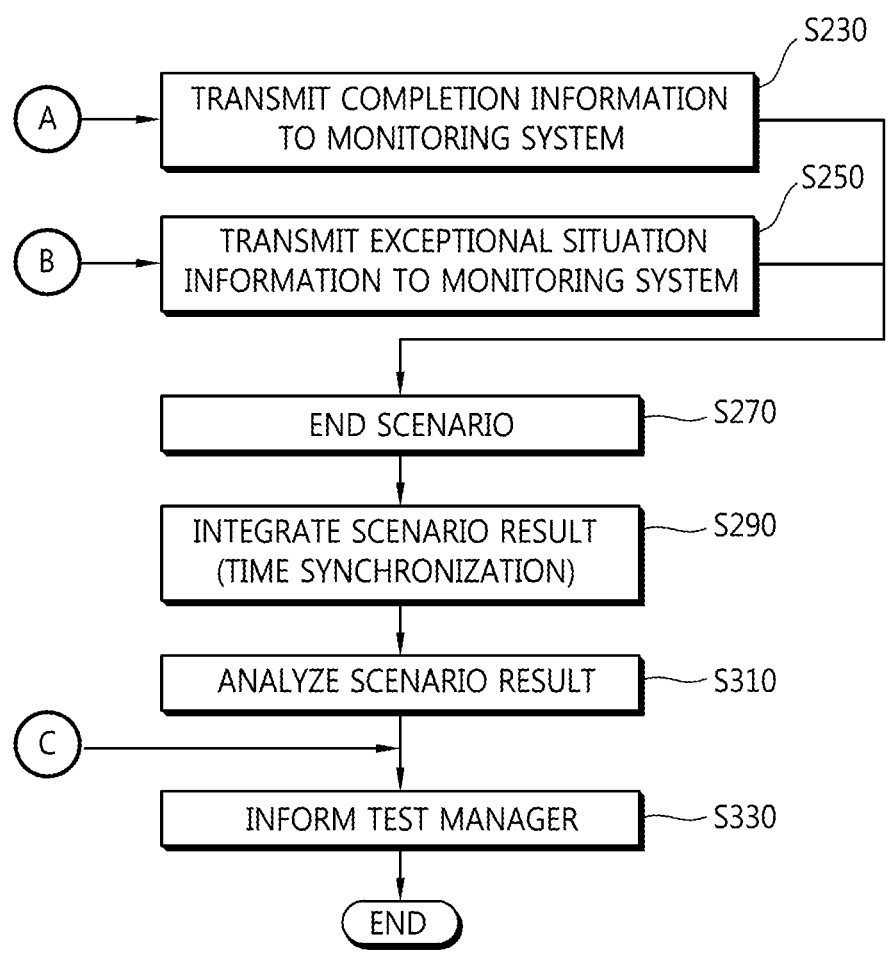

FIGS. 5 and 6 are flow charts of a method for analyzing a test analysis system of a network according to another exemplary embodiment of the present invention.

By the configuration, an analysis method of the test analysis system 1 of a network according to the exemplary embodiment of the present invention will be described with reference to FIGS. 5 and 6.

First, time synchronization information of the server 10 of the server group, the client 30 of the client group, and the monitoring system 50 is calculated (S100). The tester selects any one of the test scenarios to execute the test scenarios (S130). In this case, the client 30 transmits the corresponding test scenario execution information and the execution information time to the monitoring system 50.

After the test scenarios are executed, it is determined that the scenarios are completed (S150). When the scenarios are not completed, it is determined that the exceptional situations (errors or mission execution failure) occur on the scenarios (S170). At 'S150', when the scenarios are completed, the completion information is transmitted to the monitoring system 50 along flow 'A'.

At 'S170', when the exceptional situations of the scenarios do not occur, the real-time information of the server group and the client group is generated and the server local log and the local log are generated (S190). Further, it is determined that the server local log and the local log are stored (S210). At 'S210', if the server local log and the local log are stored, then it is determined that the scenarios are completed at 'S150'. Meanwhile, at 'S210', when the server local and the local log are not stored, the server 10 and client 30 real-time information is informed to the test manager along flow 'C' (S330). The informing of the real-time information is displayed on the display unit 57.

Meanwhile, at 'S230', the completion information is transmitted to the monitoring system 50 and the scenario execution of the client 30 ends (S270). The time synchronization is implemented and the server local log and the local log and the system log of the real-time information stored in the monitoring system 50 are integrated (S290). The integrated log (scenario results) is analyzed (S310). The analyzed results are informed to the test manager using the display unit 57 (S330).

On the other hand, at 'S170', when the scenario exceptional situations are generated, the exceptional situation information is transmitted to the monitoring system 50 along flow 'B' (250). At 'S250', the exceptional situation information is transferred and the scenario execution of the client 30 ends (S270). The time synchronization is implemented and the server local log and the local log and the system log of the real-time information stored in the monitoring system 50 are integrated (S290). The integrated log is analyzed (S310). The analyzed results are informed to the test manager using the display unit 57 (S330).

Therefore, it is possible to detect the problems of the server group and the client group from various angles by performing the server group and the client test according to the test scenarios and automatically monitoring various types of information in some cases and analyzing the results, thereby making it possible to increase the stability of the network system.

The test analysis system of a network and the analysis method thereof according to the exemplary embodiments of the present invention can detect the problems of the server group and the client group from various angles by performing the server group and the client test according to the test scenarios and automatically monitoring various types of information in some cases and analyzing the results, thereby making it possible to increase the stability of the network system.

While the present invention has been shown and described in connection with the embodiments, it will be apparent to those skilled in the art that modifications and variations can be made without departing from the spirit and scope of the invention as defined by the appended claims. Therefore, coming variations of the exemplary embodiments of the present invention will not depart from the technology of the present invention. It should be interpreted that the scope of the present invention is defined by the following claims rather than the above-mentioned detailed description and all modifications or alterations deduced from the meaning, the scope, and equivalences of the claims are included in the scope of the present invention.

What is claimed is:

1. A test analysis system of a network, comprising: a server group having at least one server of configured to perform one or more of generation of first real-time information according to a test scenario and storage of a server local log according to the test scenario;
a client group having at least one client configured to communicate with the server group and to perform one or more of generation of second real-time information according to the test scenario and storage of a local log according to the test scenario; and
a monitoring system configured to the real time information as a system log while monitoring receive the first and second real-time information from the server group and the client group respectively and store the received first and second real-time information as a system log during the execution of the test scenario, and to inform a test manager of the first or second real-time information, wherein the monitoring system integrally analyzes the server local log received from the server group, the local log received from the client group, and the system log and informs the test manager of the integrally analyzed logs after the test scenario completed, wherein the monitoring system includes:
a communication unit configured to communicate with the server group and the client group so as to receive the real-time information, the server local log, and the local log;
a monitoring storage unit configured to store the real-time information received from the communication unit as the system log;
an integration analysis unit configured to integrally analyze the server local log received from the communication unit and the local log and the system log stored in the monitoring storage unit;
a display unit configured to display one or more of the first and second real-time information received in the communication unit and to display analysis data analyzed from the integration analysis unit; and
a control unit configured to control the display unit so as to display one or more of the first and second real-time information received in the communication unit and controlling to control the display unit so as to display the analysis data based on signals analyzed by the integration analysis unit, wherein an entire amount of data included in each of the first and second real-time information a is smaller than an amount of data in either of that of the server local log and the local log.

2. The test analysis system of a network of claim 1, wherein an entire amount of data included in each of the first and second real-time information a is smaller than an amount of data in either of that of the server local log and the local log.

3. The test analysis system of a network of claim 2, wherein the first or second real-time information includes a CPU, a memory, an HDD, a network load amount, Ping, and roundtrip time (RTT).

4. The test analysis system of a network of claim 2, wherein the server local log and the local log include system information and application information of the server group and the client group during the execution of the test scenario.

5. The test analysis system of a network of claim 2, wherein the server local log and the local log are integrated with the system log at the time of the test result analysis.

6. The test analysis system of a network of claim 5, wherein the integration of the server local log and the local log with the system log is performed after synchronization of each storage time.

7. The test analysis system of a network of claim 1, wherein the first or second real-time information includes a CPU, a memory, an HDD, a network load amount, Ping, and roundtrip time (RTT).

8. The test analysis system of a network of claim 1, wherein the server local log and the local log include system information and application information of the server group and the client group during the execution of the test scenario.

9. The test analysis system of a network of claim 1, wherein the server local log and the local log are integrated with the system log at the time of the test result analysis.

10. The test analysis system of a network of claim 1, wherein the monitoring system receives is configured to receive start, completion, and exceptional situation information of the test scenario from the server group and the client group.

11. A test analysis method of a network including a server group having at least one server, a client group having at least one client, and a monitoring system, the test analysis method comprising:
- (a) calculating time synchronization information of the server group, the client group, and the monitoring system;
- (b) storing a server local log according to a test scenario and a local log according to the test scenario in the server group and the client group, respectively, while transmitting first and second real-time information according to the test scenario of the server group and the client group, respectively, to the monitoring system at the time of executing the test scenario;
- (c) storing the first and second real-time information in the monitoring system as a system log while informing a test manager of the first and second real-time information group transmitted to the monitoring system;
- (d) generating an integrated log by integrating the server local log, the local log, and the system log after the execution of the test is completed; and
- (e) informing the test manager of analyzed results by analyzing the integrated log, wherein the monitoring system includes:
- a communication unit configured to communicate with the server group and the client group so as to receive the real-time information, the server local log, and the local log;
- a monitoring storage unit configured to store the real-time information received from the communication unit as the system log;
- an integration analysis unit configured to integrally analyze the server local log received from the communication unit and the local log and the system log stored in the monitoring storage unit;
- a display unit configured to display one or more of the first and second real-time information received in the communication unit and to display analysis data analyzed from the integration analysis unit; and
- a control unit configured to control the display unit so as to display one or more of the first and second real-time information received in the communication unit and to control the display unit so as to display the analysis data based on signals analyzed by the integration analysis unit, wherein an entire amount of data included in each of the first and second real-time information a is smaller than an amount of data in either of that of the server local log and the local log.

12. The test analysis method of a network of claim 11, wherein at step (b), start, completion, and exceptional situations of the test scenario are transmitted to the monitoring system at the time of the execution of the test scenario.

13. The test analysis method of a network of claim 11, wherein at step (b), start, completion, and exceptional situations of the test scenario are transmitted to the monitoring system at the time of the execution of the test scenario.

14. The test analysis method of a network of claim 11, wherein at step (d), the integration of the server local log and the local log with the system log is performed after performing synchronization using time synchronization information.

15. The test analysis method of a network of claim 11, wherein at step (d), the integration of the server local log and the local log with the system log is performed after performing synchronization using time synchronization information.

16. The test analysis method of a network of claim 11, wherein the first or second real-time information includes a CPU, a memory, an HDD, a network load amount, Ping, and round-trip time (RTT).

17. The test analysis method of a network of claim 11, wherein the server local log and the local log include system information and application information of the server group and the client group during the execution of the test scenario.

* * * * *